(12) United States Patent
Fletcher

(10) Patent No.: US 11,797,167 B2
(45) Date of Patent: Oct. 24, 2023

(54) USER INTERFACE FOR MANAGEMENT OF A DYNAMIC VIDEO SIGNAL PROCESSING PLATFORM

(71) Applicant: Grass Valley Canada, Montreal (CA)

(72) Inventor: Ian David Fletcher, Castle Donington (GB)

(73) Assignee: GRASS VALLEY CANADA, Montreal (CA)

( * ) Notice: Subject to any disclaimer, the term of this patent is extended or adjusted under 35 U.S.C. 154(b) by 0 days.

(21) Appl. No.: 17/812,593

(22) Filed: Jul. 14, 2022

(65) Prior Publication Data

US 2022/0350475 A1 Nov. 3, 2022

Related U.S. Application Data

(63) Continuation of application No. 17/007,148, filed on Aug. 31, 2020, now Pat. No. 11,429,268, which is a
(Continued)

(51) Int. Cl.
*G06F 3/04847* (2022.01)
*G06F 9/451* (2018.01)
(Continued)

(52) U.S. Cl.
CPC ........ *G06F 3/04847* (2013.01); *G06F 3/0483* (2013.01); *G06F 9/451* (2018.02);
(Continued)

(58) Field of Classification Search
CPC .... G06F 3/04847; G06F 3/0483; G06F 9/451; G06F 3/0619; G06F 9/455; G06F 9/45533; G06F 9/5027; G06F 9/5077; H04L 47/70
See application file for complete search history.

(56) References Cited

U.S. PATENT DOCUMENTS

2013/0124797 A1* 5/2013 Hamblin ............... G06F 3/0608
711/E12.001
2014/0244881 A1* 8/2014 Stewart ................. G06F 13/409
710/302

* cited by examiner

*Primary Examiner* — Quoc A Tran
(74) *Attorney, Agent, or Firm* — ARENTFOX SCHIFF LLP

(57) ABSTRACT

A computing device and method for providing a user interface for summarizing and presenting information regarding dynamic provisioning and deployment of media processing resources, in a manner that is easy and intuitive and analogizes well to conventional physical media processing deployment. Users are not required to understand hypervisor configuration or virtual machine deployment, or switch through various layers and screens to find configuration information or controls, a process that may be particularly slow, complex, and difficult to learn, particularly for media and broadcast engineers unfamiliar with virtualization technologies. Instead, the present user interface improves efficiency of use of the computing environment for media processing, by providing deployment information in a format similar to physical processing deployment. Furthermore, because the user interface lends itself to intuitive monitoring and use, users may more accurately and efficiently deploy and undeploy processing resources, reducing overall system processing requirements, cost, and power consumption.

22 Claims, 8 Drawing Sheets

Related U.S. Application Data continuation of application No. 15/920,095, filed on Mar. 13, 2018, now Pat. No. 10,761,707.

(60) Provisional application No. 62/471,275, filed on Mar. 14, 2017.

(51) Int. Cl.
*G06F 3/0483* (2013.01)
*G06F 9/50* (2006.01)
*H04L 47/70* (2022.01)
*G06F 3/06* (2006.01)
*G06F 9/455* (2018.01)
*G06F 17/00* (2019.01)

(52) U.S. Cl.
CPC ............ *G06F 3/0619* (2013.01); *G06F 9/455* (2013.01); *G06F 9/45533* (2013.01); *G06F 9/5027* (2013.01); *G06F 9/5077* (2013.01); *H04L 47/70* (2013.01)

| Overview | Packages | Status | Nodes | Edit |
|---|---|---|---|---|

702

| Application | State | Package | Version |
|---|---|---|---|
| Stills-1 | Running | Stills Store | 1.0.0 |
| AdilStillStore | Stopped | Stills Store | 1.0.0 |
| KVP | Stopped | HD to SD Converter | 1.0.0 |
| KSS | Stopped | Stills Store | 1.0.0 |
| itx | Running | iTX Channel | 2.7.0 |
| Logo-1 | Stopped | Logo Generator | 1.0.0 |
| Clip Player 1 | Running | Clip Player | 1.0.0 |
| AdilClipPlayer | Stopped | Clip Player | 1.0.0 |
| Test Signal | Running | Test Signal Generator | 1.0.0 |
| Clip Player 1 (SD) | Running | HD to SD Converter | 1.0.0 |
| Clip Player 1 (1080P) | Stopped | SD to HD Converter | 2.7.0 |
| AdilChan | Active | iTX Channel | 1.0.0 |

Application

Name
Clip Player 1 (SD)

State
Running

Description
Clip Player 1 (SD)

Previous State
Starting

Health
Failed to cue live source

URI
http://10.118.10.7:8085

Processes

Name
Video Processor

USER INTERFACE FOR MANAGEMENT OF A DYNAMIC VIDEO SIGNAL PROCESSING PLATFORM

CROSS REFERENCE TO RELATED APPLICATIONS

The current application is a continuation of U.S. patent application Ser. No. 17/007,148, filed Aug. 31, 2020, which is a continuation of U.S. patent application Ser. No. 15/920,095, filed Mar. 13, 2018, and now issued as U.S. Pat. No. 10,761,707, which claims priority to U.S. Patent Provisional Application No. 62/471,275, filed Mar. 14, 2017, the entire contents of each of which are hereby incorporated by reference.

FIELD

The present disclosure relates generally to methods and systems for providing an intuitive user interface for management of media processing, including video signal processing, across a plurality of network processing nodes.

BACKGROUND

In the past, in order to create a video signal flow for processing a video signal, physical equipment need to be acquired and physically assembled together in a rack of equipment. A physical equipment rack is a frame that is used to hold various hardware devices, e.g., servers, hard disk drives, and other electronic equipment. Devices, such as, e.g., an up-converter, might be included in such equipment racks for video signal processing. The equipment rack typically contains multiple slots for physically receiving a piece of equipment. The slots, also called bays, are designed to receive and hold the units of equipment. The individual equipment devices may be inserted into a slot and fixed with a screw or other fastening mechanism.

An equipment rack needed to be equipped with all equipment that might be needed for potential signal processing needs. Updating the capabilities of the video processing equipment might require acquiring and physically inserting a new piece of equipment or a new card into the rack unit. As the equipment needed to be physically acquired and installed to meet the video processing needs of a user, the user needed to overprovision the rack by anticipating a peak capacity of needs.

Broadcast and media production engineers are familiar with the paradigm of physical racks with processing equipment, as discrete processing units have been utilized in broadcast environments for close to a century. Physical jackfields or patch bays are utilized to route signals through these processing units, with instant and intuitive visual indications of signal flow.

However, with the rise of digital processing and, in particular, virtual machine environments with cloud-based servers or clusters that provide media processing capabilities, deployment of processing resources is no longer intuitive. In particular, as many broadcast and media production engineers may lack significant information technology experience, the concept of dynamic instantiation of virtual machines and virtual appliances may be alien and inaccessible.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In order to address the problem in configuring and managing various applications for performing broadcast tasks, the present application provides the ability for a user to dynamically optimize a video signal processing platform. A cluster manager may dynamically manage a distribution of virtual media processing devices across a group of network processing nodes according to a user input regarding signal processing capabilities needed by the user. A graphical representation of the video signal processing platform including the instantiated virtual media processing devices may be provided to the user at a user interface. The user interface may provide, e.g., a Virtual Rack Unit (VRU) configuration that illustrates a configuration of virtual media processing devices that are dynamically distributed across the network processing nodes using a familiar and intuitive physical equipment rack design. The user interface may enable the user to add and remove application instances, e.g., to provision and un-provision the virtual media processing devices, by dragging and dropping icons in a slot on a graphical VRU configuration rack. Based on the configuration entered at the user interface, a cluster manager may dynamically create and allocate the virtual media processing devices to available network processing nodes.

Accordingly, the user interface provided by the systems and methods discussed herein provides a particular manner of summarizing and presenting information regarding dynamic provisioning and deployment of media processing resources, in a manner that is easy and intuitive and analogizes well to conventional physical media processing deployment. Unlike prior art virtual machine monitor (VMM) interfaces, users are not required to understand hypervisor configuration or virtual machine deployment, or switch through various layers and screens to find configuration information or controls, a process that may be particularly slow, complex, and difficult to learn, particularly for media and broadcast engineers unfamiliar with virtualization technologies. Instead, the present user interface improves efficiency of use of the computing environment for media processing, by providing deployment information in a format similar to physical processing deployment. Furthermore, because the user interface lends itself to intuitive monitoring and use, users may more accurately and efficiently deploy and undeploy processing resources, reducing overall system processing requirements, cost, and power consumption.

In one aspect, the present disclosure is directed to a computing device comprising a display screen, the computing device being configured to display on the screen at least one virtual equipment rack comprising a plurality of slots, and at least one item of virtual equipment in at least one slot of the plurality of slots. Each item of virtual equipment represents an instance of a virtual media processing application executed by at least one remote computing device; and each item of virtual equipment occupies a number of slots of the plurality of slots of the virtual equipment rack proportional to the amount of computing resources utilized by the corresponding virtual media processing application.

In some implementations, the total number of slots of the at least one virtual equipment rack corresponds to a total amount of computing resources available for the virtual media processing applications. In some implementations, each item of virtual equipment further comprises an indicator of an execution state of the corresponding instance of the virtual media processing application. In a further implementation, the execution states comprise provisioned, executing, and non-provisioned. In another further implementation, the computing device is configured to retrieve an identification of the execution state of each virtual media processing application from the at least one remote computing device. In still another further implementation, responsive to detection of a user interaction with an item of virtual equipment, the computing device is configured to transmit a configuration command for the corresponding virtual media processing application to the at least one remote computing device.

In some implementations, each item of virtual equipment further comprises a predetermined indicator of a type of the corresponding instance of the virtual media processing application, the predetermined indicator comprising a predetermined color or pattern corresponding to the type. In some implementations, the computing device is configured to direct the at least one remote computing device to provide a media signal from a first virtual media processing application to a second virtual media processing application, responsive to a first item of virtual equipment corresponding to the first virtual media processing application occupying a slot adjacent to a slot containing a second item of virtual equipment corresponding to the second virtual media processing application in the virtual equipment rack. In some implementations, the computing device is further configured to display on the screen an indicator of a total amount of media processing capacity available to computing device. In some implementations, the at least one remote computing device comprises a cluster of computing devices executing at least one virtual computing device.

In another aspect, the present disclosure is directed to a method that includes displaying, on a computing device comprising a display screen, at least one virtual equipment rack comprising a plurality of slots. The method also includes displaying at least one item of virtual equipment in at least one slot of the plurality of slots, each item of virtual equipment representing an instance of a virtual media processing application executed by at least one remote computing device. The method also includes retrieving an identification of an execution state of each virtual media processing application from the at least one remote computing device; and modifying the display of the at least one item of virtual equipment to display an indicator of the execution state of the corresponding instance of the virtual media processing application.

In some implementations, each item of virtual equipment occupies a number of slots of the plurality of slots of the virtual equipment rack proportional to the amount of computing resources utilized by the corresponding virtual media processing application. In some implementations, the total number of slots of the at least one virtual equipment rack corresponds to a total amount of computing resources available for the virtual media processing applications.

In some implementations, the execution states comprise provisioned, executing, and non-provisioned. In some implementations, the method includes, responsive to detection of a user interaction with an item of virtual equipment, transmitting a configuration command for the corresponding virtual media processing application to the at least one remote computing device. In some implementations, each item of virtual equipment further comprises a predetermined indicator of a type of the corresponding instance of the virtual media processing application, the predetermined indicator comprising a predetermined color or pattern corresponding to the type.

In some implementations, the method includes directing the at least one remote computing device to provide a media signal from a first virtual media processing application to a second virtual media processing application, responsive to a first item of virtual equipment corresponding to the first virtual media processing application occupying a slot adjacent to a slot containing a second item of virtual equipment corresponding to the second virtual media processing application in the virtual equipment rack. In some implementations, the method includes directing the at least one remote computing device to provide a media signal from a first virtual media processing application to a second virtual media processing application, responsive to a first item of virtual equipment corresponding to the first virtual media processing application occupying a slot adjacent to a slot containing a second item of virtual equipment corresponding to the second virtual media processing application in the virtual equipment rack. In some implementations, the method includes, responsive to detection of a user interaction with an executing item of virtual equipment, transmitting a deprovisioning command for the corresponding virtual media processing application to the at least one remote computing device. In some implementations, the at least one remote computing device comprises a cluster of computing devices executing at least one virtual computing device.

In another aspect of the disclosure, a method, a computer-readable medium, and an apparatus are provided. The apparatus, e.g., may be configured to receive a user input regarding signal processing capabilities. The apparatus determines network processing node resources of distributed network processing nodes and dynamically instantiates virtual media processing devices based on the user input to provide the signal processing capabilities. The apparatus may allocate the instantiated plurality of different virtual media processing devices across the distributed network processing nodes to form a video signal processing flow based on the determined network processing node resources and may process a video signal using the video signal processing flow. A graphical representation of the instantiated virtual media processing devices may be provided to a user at a user interface.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 7 illustrates an example user interface page showing a status summary of applications in a VRU configuration according to aspects of the present application.

DETAILED DESCRIPTION

Figure 1:
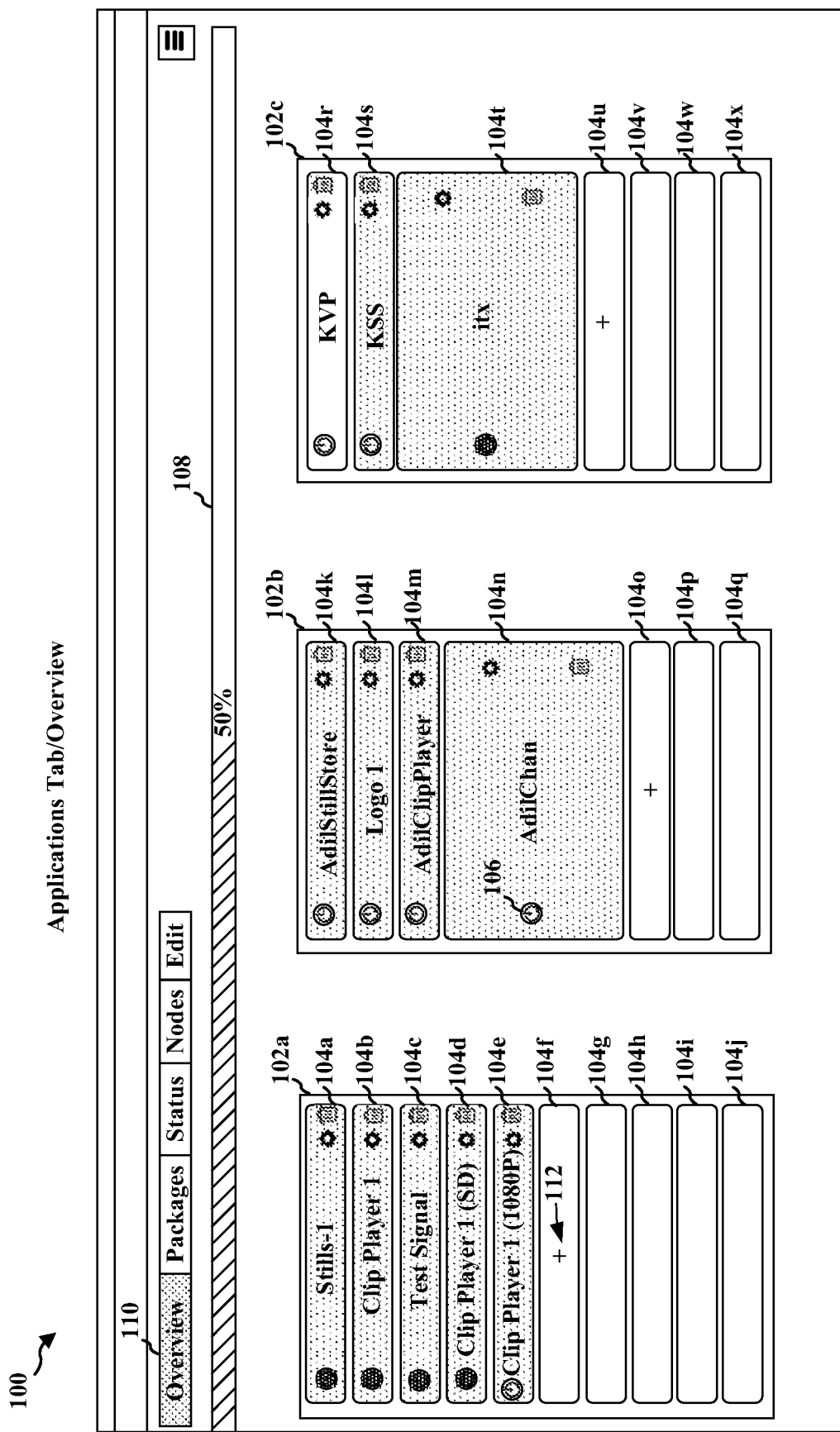
FIG. 1 illustrates an example user interface page showing an overview of a VRU configuration according to aspects of the present application.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of a dynamic video signal processing platform system and method will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

The present application provides a way to alleviate problems associated with previous physical equipment racks. The present application provides the ability for a user to dynamically optimize a video signal processing platform. A cluster manager may dynamically manage a distribution of virtual media processing devices across a group of network processing nodes according to a user input regarding signal processing capabilities needed by the user.

A graphical representation of the instantiated virtual media processing devices may be provided to the user at a user interface. The user interface may provide, e.g., a Virtual Rack Unit (VRU) configuration that illustrates a configuration of virtual media processing devices that are dynamically distributed across the network processing nodes using a familiar and intuitive physical equipment rack design.

The user interface may enable the user to add and remove application instances, to provision and un-provision the virtual media processing devices, by dragging and dropping icons in a slot on a graphical VRU configuration rack. Based on the configuration entered at the user interface, a cluster manager may dynamically create and allocate the virtual media processing devices to available network processing nodes. This removes the need for a user to physically acquire and install a piece of equipment in order to meet changing video signal needs and reduces the need for a user to overprovision equipment to meet possible peak capacity needs. Instead, virtual media processing devices can be dynamically instantiated and allocated across network processing nodes according to current signal processing capabilities needed by the user. As needs change, virtual media processing devices may be decommissioned, and new virtual media processing devices may be dynamically instantiated and allocated across the network processing nodes.

A group of network processing nodes (e.g., 304, 306) managed by a cluster manager (e.g., cluster manager 312, 312') may be referred to herein as a cluster. The network processing nodes may be comprised in any of a personal network, a distributed network, a cloud based network, etc. A cluster manager may store applications that provide various video signal processing capabilities. The cluster manager may dynamically create a virtual media processing device according to the stored applications based on user input regarding a signal processing capability needed by the user. The cluster manager may distribute an instance of the virtual media processing device, including the corresponding applications, out to at least one network processing node in the cluster. As a part of distributing the virtual media processing device to at least one node, the cluster manager may determine whether to distribute an application for the virtual media processing device to a single node or whether to decompose the application into subsets of the application and to distribute the subsets to the single node or to multiple nodes in the cluster.

The cluster manager may control the placement of software across the network processing nodes of the cluster based on the available computing resources at the nodes and the requirements of the virtual media processing device. Multiple instances of the virtual media processing device may be instantiated and distributed to a single node or across multiple nodes of the cluster to meet the capabilities needed by the user at a given time. Different virtual media devices distributed across the network processing nodes of the cluster may form a signal processing flow that may be used together to process a video signal. As the user enters different video signal processing capabilities, the virtual media processing device may be decommissioned. Different virtual media processing devices may be created and distributed by the cluster manager. Thus, a virtual video signal processing platform may be optimized according to changing video signal processing needs.

Thus, the aspects presented herein enable a cluster manager to efficiently determine virtual media processing devices and a corresponding amount of resources required to meet a user's needs and to dynamically and distribute virtual media processing devices across a cluster of network processing nodes.

Figure 6:
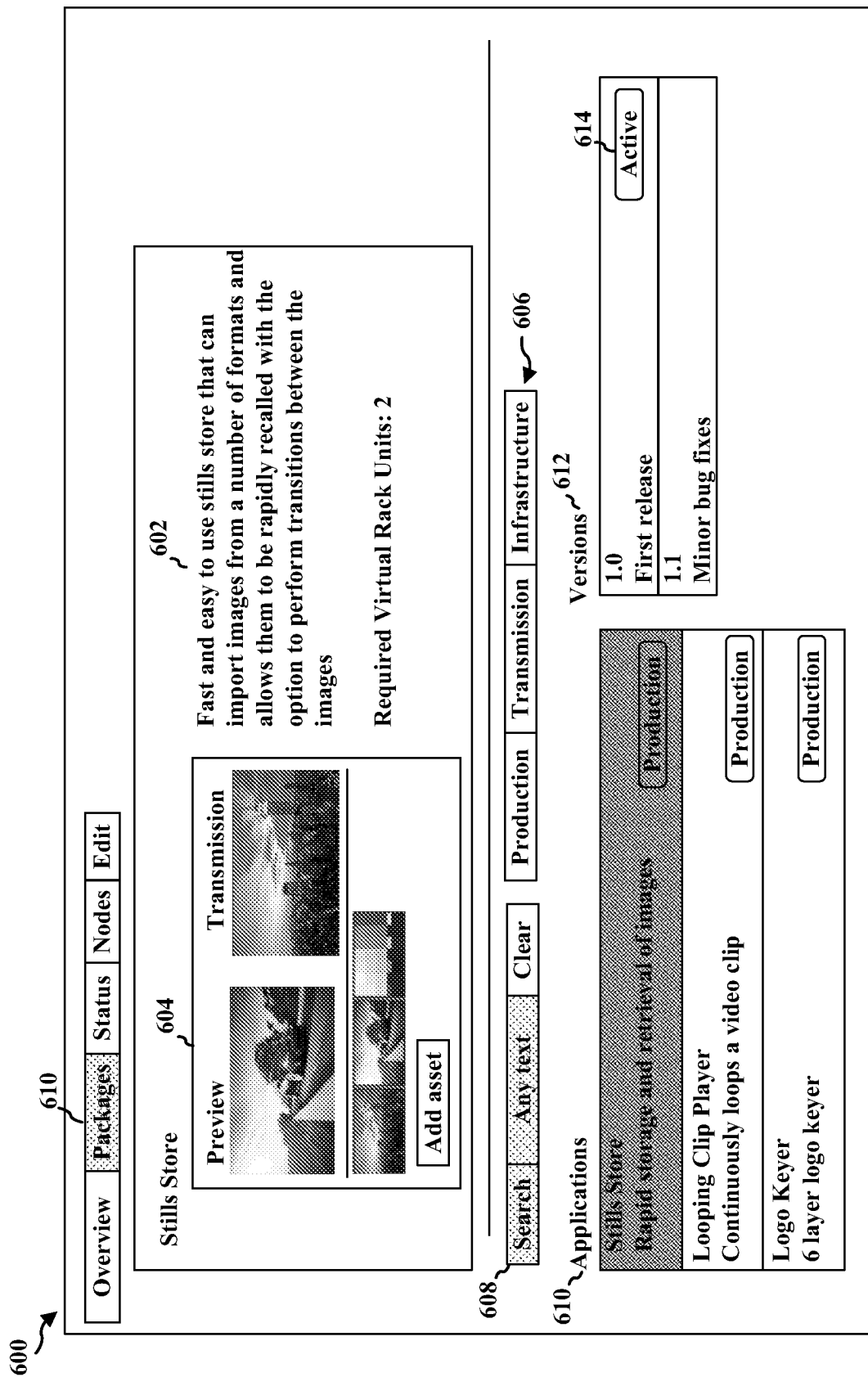
FIG. 6 illustrates an example user interface page showing a package or application store for a VRU configuration according to aspects of the present application.
Figure 8:
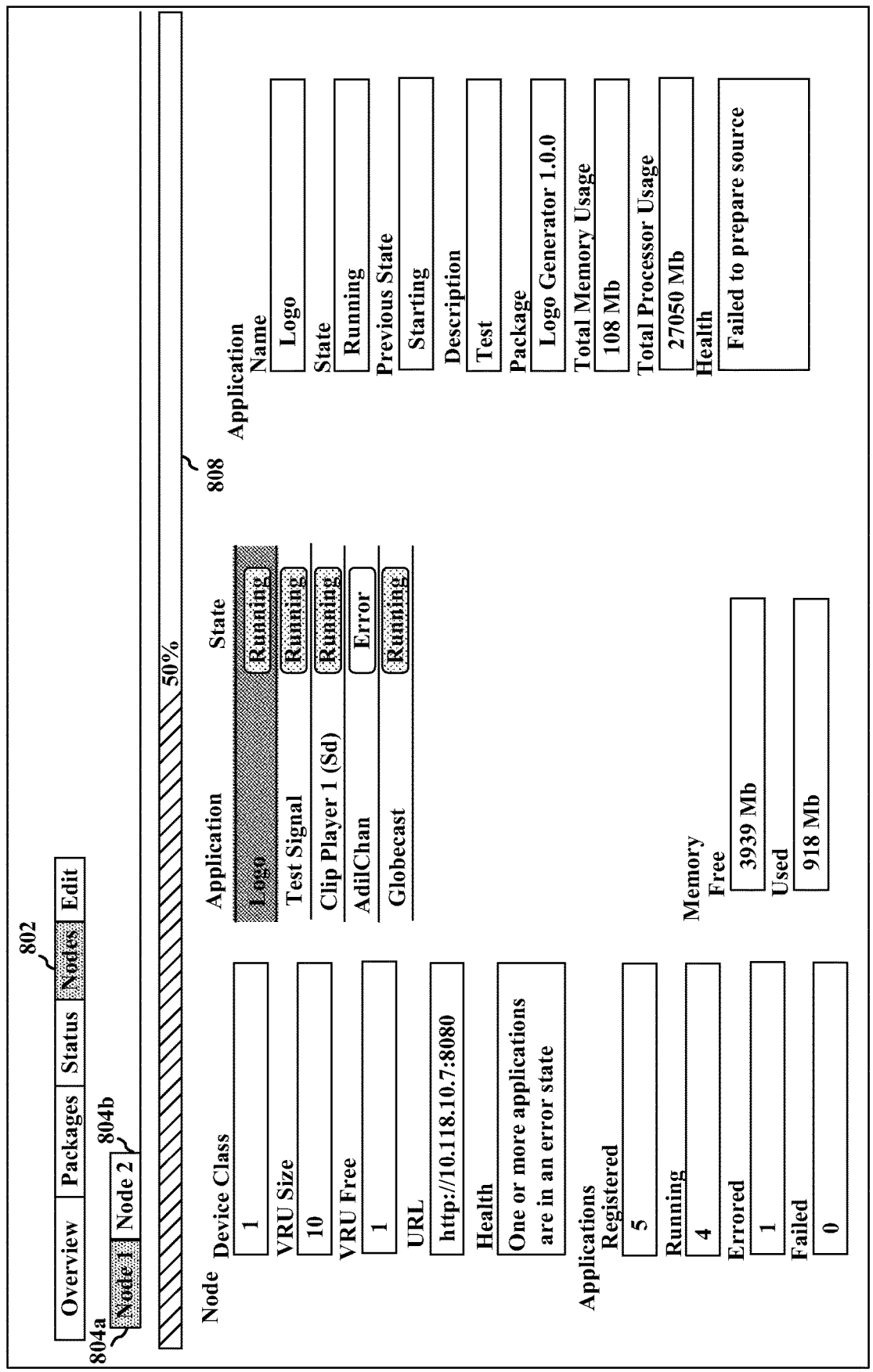
FIG. 8 illustrates an example user interface page showing information regarding nodes of a VRU configuration according to aspects of the present application.

Aspects further provide a way to visually present the allocation to a user in a easily understood manner. A user interface may provide a graphical representation of a VRU using a familiar equipment rack structure that correlates to the configuration of software applications by virtual placement of a virtual media processing device in a virtual slot of a VRU rack. FIG. 1 illustrates example aspects of a user interface 100 presenting a VRU configuration having multiple racks, 102a, 102b, 102c. Each rack 102a, 102b, 102c comprising a plurality of slots 104a-x. Rack units in the VRU configuration do not necessarily correspond to a physical source of computing capacity. For example, a user interface having 5 rack units does not necessarily indicate 5 servers of computing capacity. In certain aspects, the VRU rack units may represent an amount of overall computing capacity available to a user. At the top of the user interface 100 in FIG. 1 are tabs representing additional pages of the user interface. The user interface page in FIG. 1 may correspond to an overview tab 110 that shows a current configuration of virtual media processing devices for a user. Other information may be graphically provided to the user via other tabs. FIGS. 6-8 provide a few examples of possible information that could be provided to the user via such a user interface.

The total number of slots 104a-x in the VRU racks may correspond to an amount of computing resources available to the user. For example, the configuration of the VRU may relate to an amount of computing resources available to the user for performing broadcast processing. The user interface allows the user to see a visual representation of the amount of available computing resources and the current allocation of those resources in an easily understood manner. The user interface may also enable the user to interact with the cluster manager to adjust the allocation of available computing resources to video processing needs in an intuitive way. The virtual media processing devices may be graphically arranged on the virtual racks in any order selected by the user. If additional racks 102a-c are needed, a tab with additional rows of VRU racks may be displayed. The user interface may enable the user to rename the rows of racks 102a, 102b, 102c.

Different portions of the VRU racks may be assigned to virtual media processing devices, or application instances, selected by the user. This assignment of available computing resources to certain virtual media processing devices may be preconfigured and may also be dynamically configurable by the user. The VRU racks may visually represent the configuration of each application instance as a virtual piece of equipment in the VRU racks of the user interface. This provides a visual representation of a software broadcast system to the user with the familiar look of a physical equipment rack unit. The user is then able to configure a video signal flow with the needed signal processing capabilities by placing virtual media processing device icons into available graphical VRU slots in an intuitive manner.

In FIG. 1, slots 104a, 104b, 104c, 104d, 104e, 104k, 104l, 104m, 104n, 104r, 104s, and 104t represent the assignment of computing resources to particular virtual media processing devices. Multiple instances of the same virtual media processing device may be dynamically instantiated, according to the video processing needs of the user. For example, 104b illustrates a first instance of a clip player application named "Clip Player 1" and 104m illustrates a second instance of a clip player application named "AdilClipPlayer." The configuration of a slot with an instance of a virtual media processing device may be visually represented in any of a number of ways. The slot may be labeled with a name for the virtual media processing device, the slot may be shaded a different color than an open slot, filled with a different fill than an open slot, etc.

The user interface 100 may include a button 106 for each virtual media processing device that enables a user to turn the virtual media processing device on/off. Turning the virtual media processing device "on" comprises provisioning an instance of the virtual media processing device. Thus, once the user configures the needed virtual media processing devices in the VRU, the user may readily form any combination of provisioned instances of the virtual media processing devices according to computing capacity by simply selecting the on/off button 106 on the desired application instances.

A visual representation may be provided to the user regarding whether the virtual media processing device is provisioned or non-provisioned. For example, the on/off button 106 may be shaded or colored a different color depending on the state of the virtual media processing device. In FIG. 1, the on/off button 106 for virtual media processing device at slot 104a, 104b, 104c, 104d, and 104t are shaded to illustrate that the virtual media processing device are provisioned. When a virtual media processing device is turned on, it is allocated to at least one network processing node having enough computing resources and suitable capabilities. During this process the on/off button 106 color may reflect the state of the virtual media processing device as it is provisioned and started up or executing. When a virtual media processing device is turned off by user selection of the on/off button 106, a conformation may be required via the cluster manager. For example, the virtual media processing device may be decommissioned by the cluster manager. This may include, e.g., shutting down the virtual media processing device and freeing up the compute resources to be used by other things. In another example, the color of the entire virtual media processing device slot may change to indicate that the virtual media processing device is provisioned. Thus, the VRU slots may be configured with a number of virtual media processing devices that would go beyond the available amount of capacity. However, the user may be limited to provisioning only an amount of the virtual media processing devices in the VRU that can be supported by the amount of capacity available to the user.

Figure 2:
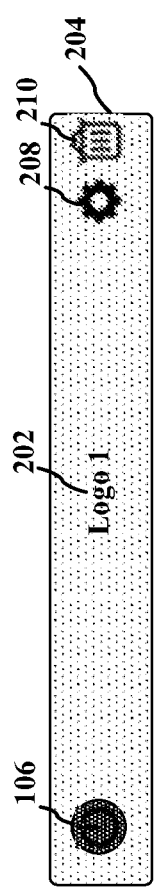
FIG. 2 illustrates an example application instance panel according to aspects of the present application.

FIG. 2 illustrates a closer view of an example virtual media processing device icon 204, e.g., corresponding to slot 104l in FIG. 1. Each virtual media processing device icon may identify the type of device using a background or name. For example, a background color, pattern, fill, etc. may be used to identify different types of applications.

Additionally, each virtual media processing device icon may be given a unique name 202 in the foreground of the icon. In FIG. 2, the virtual media processing device icon 204 has the name 202 of "Logo 1." For applications with requirements that that are higher than 1 VRU the virtual media processing device name may be justified to the top so it doesn't clash with the application type.

The user interface may comprise an edit mode that enables the user to edit a configuration of the virtual media processing device. The edit mode for each application may be reached via user selection of a settings icon 208 provided at each virtual media processing device icon 204. When the user selects the setting icon 208, a settings dialogue box may be opened, or the user interface may display a settings page for the particular application instance. A settings page may be provided of the user interface may be provided. The settings page may allow the user to set a maximum cluster capacity that would allow for spare space to be kept in the case of node failure. An elastic compute setting may allow rules to be set that would allow additional nodes to be dynamically spun up and closed down depending on demand. Each virtual media processing device icon 204 may also comprise a dustbin icon 210. Selection of such an icon may be used to remove a virtual media processing device from the VRU rack.

New virtual media processing devices may be added to the cluster by clicking on, or otherwise selecting, one of the plus icons 112 when in an edit mode. The position of the virtual media processing device icon on the VRU racks may have no impact on the physical position of the software in the cluster. However, in some implementations, the relative positions of virtual media processing devices within the VRU racks may control signal flow between the media processing applications; for example, in some implementations, signal may be routed from a first media processing application identified in a first position within the VRU rack to a second media processing application identified in a second, adjacent position within the VRU rack. Thus, while absolute position within the VRU rack may not control which server within a cluster executes any particular application, the position may be used to configure signal processing chains in some implementations. When a new virtual media processing device is added, an application store user interface may be shown as a dialog. The user may be presented with the option of placing an icon for the selected virtual media processing device, or a specific version of the selected virtual media processing device, in the VRU rack. If the user selects a normal version, then whenever the application instance corresponding to the virtual media processing device is started or provisioned, the cluster manager will select the package dynamically by checking which version is the current active one. If the user instead selects a specific version, then that specific version will always be used whenever the virtual media processing device is started. A warning icon or a message may be displayed on the cluster manager to show the user when an application version for a virtual media processing device is a fixed version specified by the user.

The user may move virtual media processing device icons around to different positions on the VRU racks 102a, 102b, 102c by dragging and dropping the virtual media processing device icon into a particular slot in the VRU rack. In some implementations, dragging and dropping the virtual media processing device may reconfigure routing of signals amongst virtual media processing devices, as discussed above. Specifically, moving a first virtual media processing device from a position adjacent to a second virtual media processing device to a position adjacent to a third virtual media processing device may direct a router or remote device to redirect a signal from the first virtual media processing device previously to the third virtual media processing device instead of the second virtual media processing device. Additionally, if the user selects the virtual media processing device icon, e.g., by clicking anywhere on the virtual media processing device icon, a page for adjusting settings for that virtual media processing device may be opened and presented to the user. The user interface may present an edit feature that allows the user to change at least one setting associated with a virtual media processing device. The changed settings may be distributed, e.g., by the cluster manager to the virtual media processing device distributed to a network processing node.

Each virtual media processing device may be either provisioned or non-provisioned at any particular point in time. When a virtual media processing device is provisioned, it is allocated to at least one node with enough space and suitable resources. A virtual media processing device instance may be allocated to a different computing node each time it is provisioned, being allocated based on available resources at the time that the virtual media processing device is turned on. The software for the virtual media processing device may be held in the remote cluster manager and an instance of the application may be pushed out or deployed to at least one network node each time an instance of the virtual media processing device is provisioned. Non-provisioned means that the virtual media processing device is not currently allocated to a network processing node. Thus, the graphical VRU racks at the user interface may show more potential slots 104a-104x than the amount of virtual media processing device instances that could be accommodated at once based on the current capacity. The amount of capacity currently being used by the provisioned/instantiated configuration of virtual media processing devices may be represented to the user in a different manner.

For example, in FIG. 1, a fuel gauge 108 may be presented that illustrates the percentage of actual capacity that is currently being used by the provisioned virtual media processing devices. The fuel gauge level may be based on the total amount of VRU capacity that is available to the user. This amount of VRU capacity may be based on the available nodes in the cluster. The fuel gauge may illustrate an amount of the total capacity that is currently being used based the number of running instances of virtual media processing devices for the user. The fuel gauge may provide a numeric representation of the amount of capacity that is currently being used and/or may visually represent the amount through shading, etc. The fuel gauge may change colors depending on the level. For example, within a first, lower range, the fuel gauge may be a first color. In a second, range, it may change to a second color. In a third, upper range, it may change to a third color. For example, under 70% the fuel gauge may be green, above 70% it may change to amber, and above 90% it may change to a red. The fuel gauge may reflect an amount of usable capacity according to user settings and/or cluster manager settings, for example, rather than the total capacity of the cluster.

Figure 3:
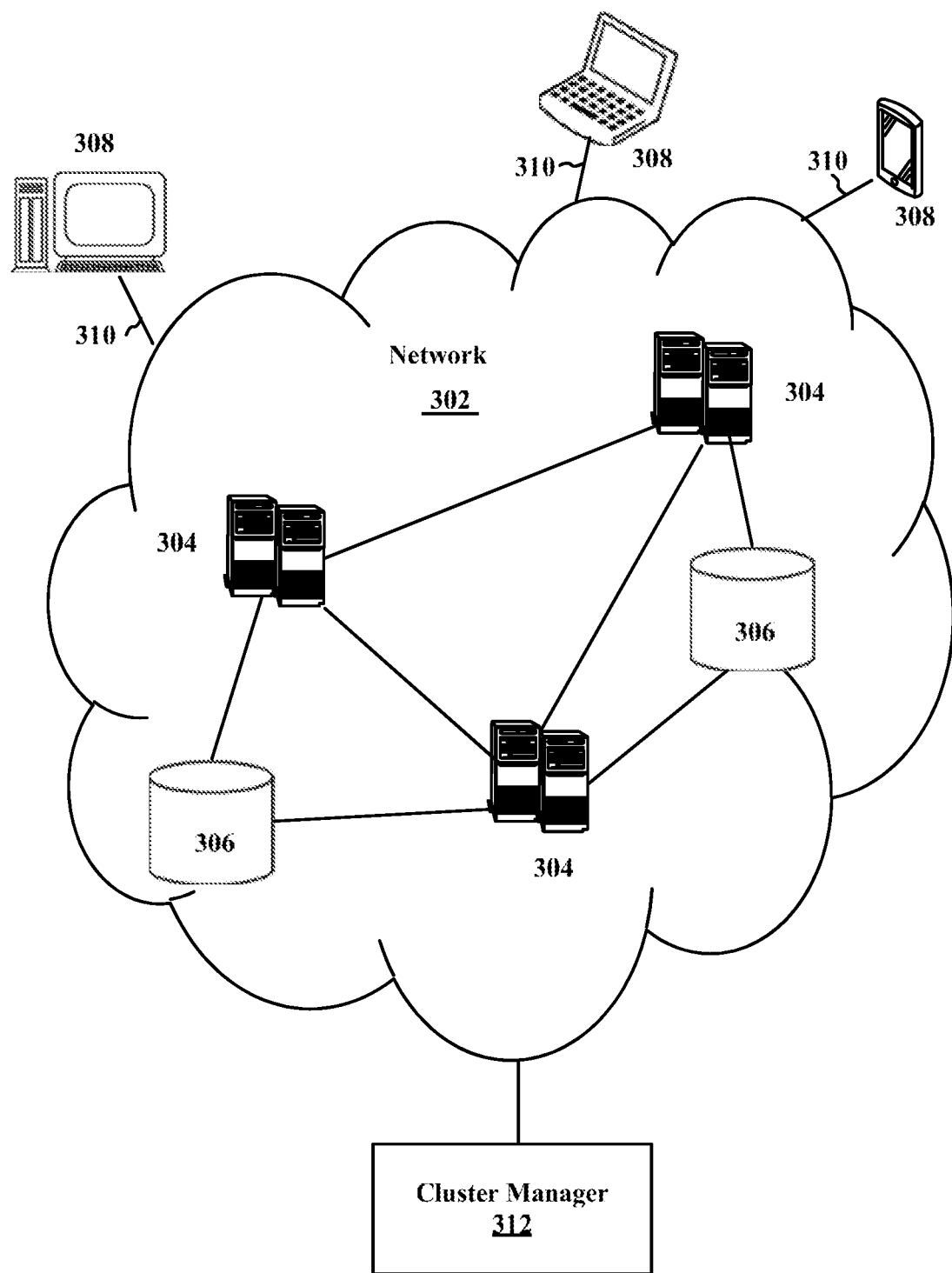
FIG. 3 illustrates an example network system usable in accordance with the VRU configuration management aspects of the present application.
Figure 5:
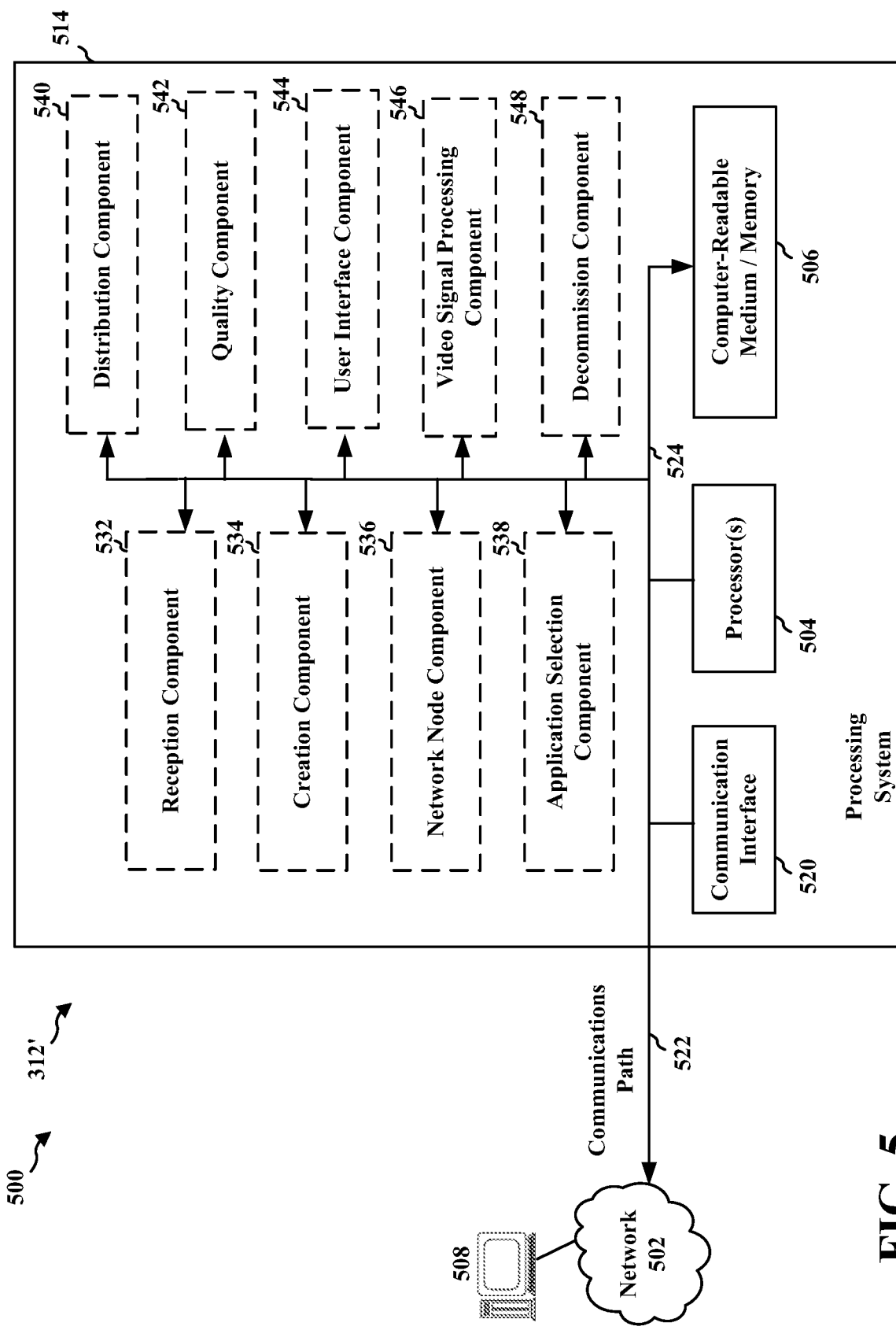
FIG. 5 illustrates an example of a hardware implementation for an apparatus employing a processing system.

As illustrated in FIGS. 3 and 5, a user interface may be coupled to a cluster manager 312, 312' via a communications path and may give users a graphical overview of their system's current configuration provided by the cluster manager. The user interface allows users to interact with the cluster manager to reconfigure and adjust their video signal processing platform configuration at will. The system may be a system of broadcast software applications distributed across a cluster of network processing nodes to form a video signal processing flow, e.g., for broadcast production. Based on user input via the user interface, the cluster manager may instantiate, distribute, monitor, and/or decommission the software applications for virtual media processing devices to suitable network processing nodes within the cluster.

The distribution by the cluster manager may take into account the availability of space as well as any special requirements of the virtual media processing device. For example, the cluster manager may be aware of a processing resource capacity and capabilities for each network processing node in an available group of nodes. The cluster manager may generate a capabilities list for each node in the group of nodes. The cluster manager may update the node information as new nodes are added or become available. Based on this knowledge and a knowledge of the resource requirements and required capabilities for the virtual media processing devices for the signal processing capability input by the user at the user interface, the cluster manager instantiates the virtual media processing device by distributing software for the virtual media processing device to a selected network processing node.

FIG. 3 illustrates aspects of a network system usable in accordance with the aspects presented herein. The system includes a network 302 that includes various servers 304 and databases 306 and other equipment that provide services to various user terminals 308 via a connection, such as a connection to the Internet. The servers 304 and databases may also be referred to as network processing nodes, nodes, nodes in a cluster, computing nodes, etc. Cluster manager 312 may be connected to the user terminals 308 via network 302 and may provide/receive communication with user terminals 308 via a user interface to enable the user to view and control their corresponding VRU configuration. Example aspects of the user interface are described in connection with FIGS. 1, 2, and 6-8. The cluster manager 312 may comprise, e.g., a web application running on a processor remote from the users at user terminal(s) 308. The cluster manager may be continually updated so that changes made to the system by one remote user are reflected on all copies of the user interface provided to corresponding other users.

The system provides access to one or more users via terminals 308. In an implementation, data for use in accordance with the aspects presented herein may be, for example, input and/or accessed by the users via terminals 308, such as personal computers (PCs), minicomputers, mainframe computers, microcomputers, telephonic devices, or wireless devices, such as personal digital assistants ("PDAs") or a hand-held wireless device coupled to nodes 304, 306, via, for example, a network 302, such as the Internet or an intranet, and couplings 310. The couplings 310 may include, for example, wired links, wireless links, fiber optic links, etc.

Figure 4:
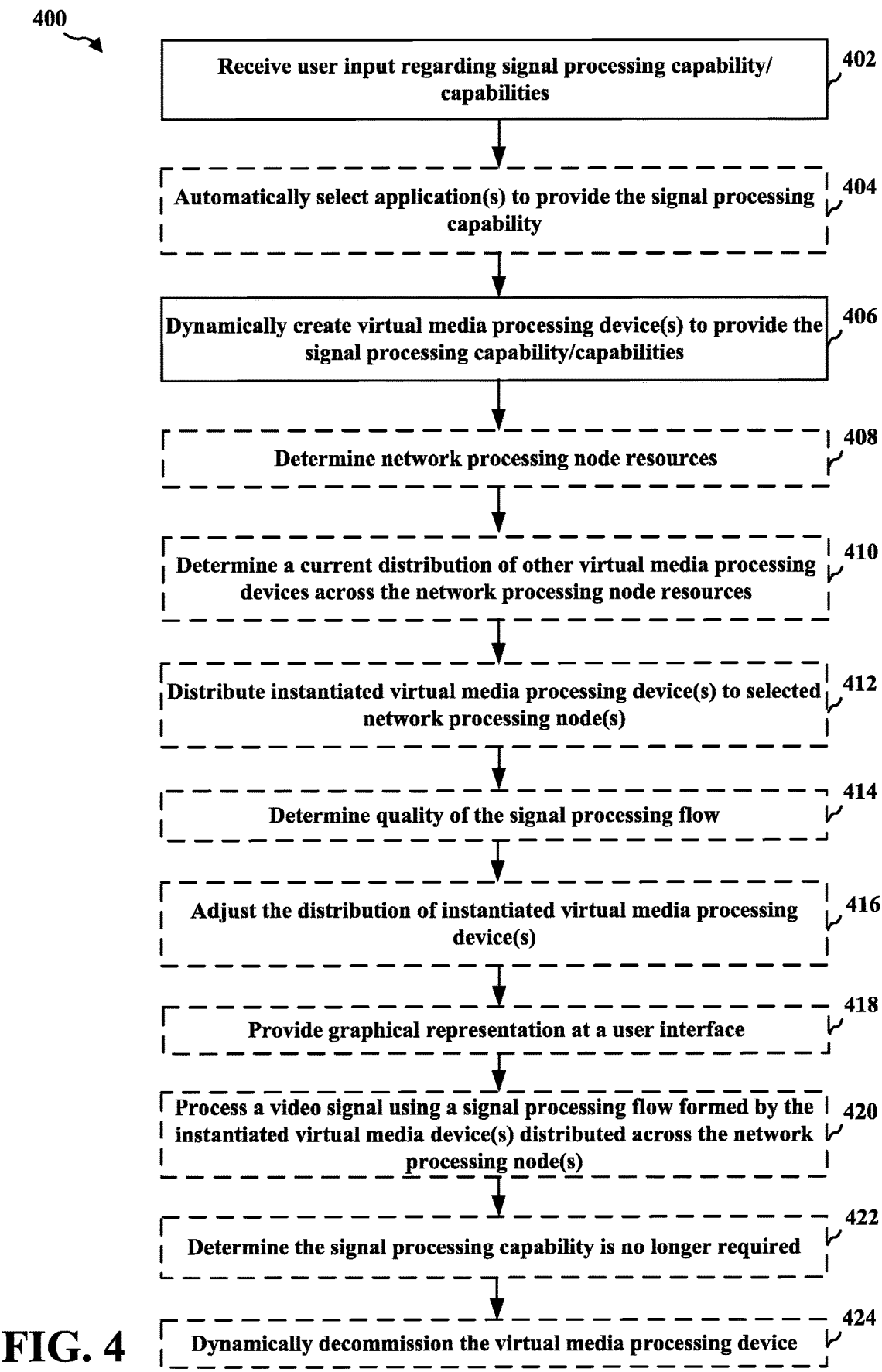
FIG. 4 illustrates a flow chart for an example method for managing a VRU configuration according to aspects of the present application.

FIG. 4 is a flowchart 400 of a method of dynamically optimizing a video signal processing platform. The method may be performed by a remote manager, e.g., cluster manager 312, 312' in FIGS. 3 and 5. Such an apparatus may comprise memory, e.g., 506, and at least one processor, e.g., 504, coupled to the memory and coupled to at least one network processing node, e.g., 304, 306. The at least one processor 504 may be configured to perform any of the aspects described in connection with FIG. 4. Optional aspects in the flowchart of FIG. 4 are illustrated using a dashed line. At 402, the cluster manager receives a user input regarding a signal processing capability. For example, the user input may be received via a user interface, as described in connection with FIGS. 1, 2, and 6-8 and may indicate a need for a particular signal processing capability as a part of a video signal processing flow.

Then, at 406, the cluster manager dynamically creates a virtual media processing device to provide the signal processing capability. Dynamically creating the virtual media processing device may comprise determining at least one application that will provide the signal processing capability based on the received user input.

In one example, in response to the user input at 402, the cluster manager may determine network processing node resources of at least one network processing node at 408. The cluster manager may then determine a current distribution of other virtual media processing devices across the at least one network processing node at 410. The cluster manager may use its knowledge of the resources and capabilities of a cluster of network processing nodes to select at least one node for the distribution of the virtual media processing device. At 412, the cluster manager may instantiate the virtual media processing device by distributing the created virtual media processing device to at least one selected network processing node based on the determined network processing node resources at 408 and the determined current distribution of other virtual media processing devices at 410.

Virtual media processing devices may each have an associated resource requirement that indicates an amount of processing resources required for an instance of the virtual media processing device. Then, virtual media processing devices may be distributed by the cluster manager to at least one node of the cluster based on the processing resource requirements of the virtual media processing device and the available processing resource capacity of the various network processing nodes. Thus, the distribution at 412 may be based on requirements of an application instance for the virtual media processing device created at 406 and a capacity of the at least one network processing node.

The distribution at 412 may include maintaining a spare network processing node among a plurality of network processing nodes by refraining from distributing the application instance to the spare network processing node.

The distribution may involve an instantiation of a software application on at least one network processing node. The cluster manager may use its knowledge of the application to determine whether to distribute the application as a single application to a single node, whether to distribute multiple subsets of the application (applets) across multiple nodes, or whether to distribute multiple subsets of the application to a single node. Thus, the cluster manager is able to decompose the application into multiple applets as part of distribution to at least one network node. The cluster manager distributes the virtual media processing device to at least one network processing node to optimize a video signal processing platform for providing the signal processing capability needed by the user.

In order to provision network processing nodes on a cluster by distributing virtual media processing devices, the cluster manager may take into account any of a number of virtual media processing device placement constraints.

As a first example, the cluster manager may distribute virtual media processing device instances among the network processing nodes of the cluster based on node capabilities, e.g., among others, any of CPU usage, bandwidth, RAM usage, storage requirements, networking requirements, and/or special hardware dependency. Thus, the distribution/adjustment of distribution by the cluster manager may take into account not only the availability of space at network processing nodes but also any special requirements of the virtual media processing device and the corresponding capabilities of the nodes of the cluster. The cluster manager may calculate and maintain a record of capacity and/or a record of capabilities for each network processing node in the cluster. The record of capabilities may include information regarding, among others, a GPU; SDI inputs, outputs, and resolution; network capability; CPU instructions, etc. of each network processing node. As a part of selecting a network processing node for distribution of the virtual media processing device, the cluster manager may analyze the requirements of the virtual media processing device and the available resources and the record of capabilities of the available nodes.

As a second example, the cluster manager may distribute the virtual media processing device instances to nodes based on specific hardware dependency. For example, software applications for certain virtual media processing device may require among others, a video input/output (I/O) device, a GPU, and SDI input/output, etc. In another example, a graphics processing application may require a GPU.

As a third example, the cluster manager may also distribute the virtual media processing device instances among the network processing nodes based on whether the configuration is a main configuration or a backup configuration. This may help to ensure that the main/backup configurations are allocated on different nodes. Then, if the node on which the main configuration is allocated fails, the backup configuration may be used.

As a fourth example, the cluster manager may also distribute the virtual media processing device instances among the network processing nodes based on a priority level of the virtual media processing device instance. For example, the priority level may represent a keep alive priority level. In this example, a priority of the virtual media processing device instance may be defined in the event of cluster degradation. For example, a playout channel virtual media processing device might be designated as higher priority than a Logo Inserter virtual media processing device. In this example, the Cluster Manager might therefore shut down the Logo Inserter virtual media processing device in order to keep the playout channel virtual media processing device functioning in the event of node failure or cluster degradation.

As a fifth example, the cluster manager may also distribute the virtual media processing device instances among the network processing nodes based on whether a virtual media processing device is a real-time virtual media processing device, e.g., relies on real-time processing. Non real-time virtual media processing devices, such as transcoders, might be provided with CPU constraints to prevent the transcoding virtual media processing device from grabbing more of the CPU than the Cluster Manager has allowed for it. This may help to ensure that real time virtual media processing devices have an adequate amount of resources to meet their real-time demands.

As a sixth example, the cluster manager may distribute the virtual media processing device instances among the network processing nodes in order to allow for headroom. For example, a fully loaded network processing node may be limited to not using more than 80-90% CPU in order to allow for headroom. In another example, the cluster manager may limit the maximum number of nodes that can be occupied, or used by, virtual media processing device instances at any one time so that there is always at least one spare node in the case of failure. The cluster manager may provision the cluster for +1 or +n spare capacity, i.e., to maintain one spare node or n spare nodes. In this example, the capacity fuel gauge, e.g., 108 in FIG. 1, may show the capacity of available nodes and not the total number of nodes. In the event that the cluster manager sees a node has gone offline, it may migrate all the virtual media processing devices that were running on that node to a spare node.

Once the placement constraints have been determined for virtual media processing devices to be allocated among the network processing nodes, the cluster manager may select target nodes and may start the virtual media processing devices on the target nodes. This may include, for example, spinning up applications corresponding to the virtual media processing device on a selected network processing node and setting appropriate performance constraints, e.g., CPU usages, RAM usage, etc., for the virtual media processing device.

The cluster manager may determine at 422 that the signal processing capability is no longer required and may dynamically decommission the created virtual media processing device at 424. Decommissioning the virtual media processing device may include e.g., shutting down the virtual media processing device and freeing up the compute resources to be used by other things. The determination at 422 may be based on receiving user input regarding the video signal processing capability, e.g., the user turning the virtual media device "off" at the user interface.

An instantiated virtual media processing device and the other virtual media processing devices distributed across the at least one network processing node may form a signal processing flow, e.g., for processing a video signal as a part of broadcast processing. This may involve establishing connections between virtual media processing devices. This may be referred to as virtual "wiring" of connections between virtual media processing devices to form a video signal flow for processing a video signal. As the virtual media processing devices are software based, the connections may be established by e.g., by Internet Protocol (IP) connections, or SDI connections. One example connection using IP may be established by the cluster manager between IP:Port Out->Application B IP:Port In. In another example, for SDI, the cluster manager may establish the connection by integrating with a router control system. This may be done, in one example, through the use of virtual cross points so that the user does not have to know where the service is physically running. For SDI, the use of an video input/output (I/O) card may be treated as a resource with the I/O managed dynamically, and its current usage of inputs and outputs may be tracked by the cluster manager. The cluster manager may also work with fixed nodes, such as densite cards. When a node fails, a rules engine may determine how to allocate virtual media processing devices on a spare node, and may move each virtual media processing device's settings and update the "wiring" (e.g., IP and Port settings) to reflect the new node. For SDI applications, the SDI router may need to be updated to route to/from the new node.

Although the cluster manager may function in a completely IP environment, virtual video processing devices may also have need to interact with physical connections, e.g., using a virtual cross point, as described infra. For example, users that use IP may still have baseband signals within their facility. Therefore, it may be important for the cluster manager to operate in a hybrid or baseband environment. This may be accomplished by the cluster manager determining or receiving information regarding certain network processing nodes that have a video I/O card and also the usage of the ports on that video I/O card. Different virtual media processing devices may require different I/O, for example some may only require an output, some only an input and some both. In addition, more complex virtual media processing devices like a playout channel may require multiple inputs and outputs. A video I/O card, e.g., an AJA card, may have eight connections on it each of which can either be an input or an output.

When distributing virtual media processing devices that require baseband connectivity the cluster manager may take into account the availability of the ports on the video I/O card for a network processing node and may configure the ports accordingly. A small service may be run on each network processing node that uses the video I/O SDK in order to configure the card according to instructions from the cluster manager.

Beyond dynamically creating the virtual media processing device(s) at 406 and distributing the created virtual media processing device(s) to selected network processing nodes at 412, the cluster manager may also process a video signal at 420 using the signal processing flow formed by the instantiated virtual media processing device distributed across the at least one network processing node. The signal processing capabilities input by the user at 402 may relate to a user need for certain signal processing capabilities to process a video signal as part of video signal production and transmission. Therefore, the video signal may be processed using the instantiated virtual media processing device to meet the user's needs.

Although this example has been described in connection with a single signal processing capability, the cluster manager may receive user input(s) regarding a plurality of signal processing capabilities at 402. At 406, the cluster manager may dynamically instantiate a plurality of different virtual media processing device to provide the signal processing capabilities. The cluster manager may also instantiate a plurality of instances of the same virtual media processing device. At 412, the cluster manager may distribute the instantiated plurality of different virtual media processing devices across multiple network processing nodes. The cluster manager may determine that the optimal distribution would include distributing the virtual media processing devices to a single node, in another example. The plurality of different virtual media processing devices distributed across the network processing nodes may form a signal processing flow. Then, at 420, the cluster manager may process a video signal at 420 using the signal processing flow formed by the instantiated plurality of different virtual media processing devices distributed across the network processing nodes.

The cluster manager may determine a quality of the signal processing flow at 414. Based on the determination at 414, the cluster manager may adjust the distribution of the instantiated plurality of different virtual media processing devices across the network processing nodes at 416 when the determined quality is below a threshold. The quality determined at 414 may be based on, e.g., any of an amount of dropped frames, a queue length, and CPU utilization.

Virtual media processing devices using a software processing engine may feed information on frame drops back to the cluster manager so that the VRU size of that virtual media processing device instance can be adjusted. In the event of serious frame drops the virtual media processing device resource requirement size may be adjusted and the virtual media processing device may be moved by the cluster manager to another network processing node having capacity for its adjusted resource requirements. Elastic compute support when running on a 3rd party Infrastructure as a Service (IaaS) may allow nodes to be added and removed automatically based upon demand. For example, in a public data center, the cluster manager may request additional network processing nodes to be spun up when demand crosses a threshold level. The cluster manager may shut down the additional network processing nodes when demand drops and the additional nodes are not being used.

Aspects may further include providing a graphical representation of a configuration of the virtual media processing device(s) at a user interface, e.g., 418. The graphical representation at the user interface may include aspects described in connection with any of FIGS. 1, 2, and 6-8. For example, the user interface may illustrate the instantiated virtual media processing device using a graphical illustration of a card slot (e.g., 104*a-e*, 104*k-n*, 104 *r-t*) in a graphical representation of an equipment rack (e.g., 102*a-c*). Changes to a VRU may be graphically presented to the user via the user interface due to the addition/removal of an virtual media processing device icon at the user interface. The cluster manager 312 may receive changes input by a user at the user interface via network 302 and may create, adjust distribution, or decommission the dynamically created virtual media processing devices according to the changes input at the user interface, as described in connection with the example of FIG. 1. Based on such user interaction with a graphical representation of a media processing device at the user interface, the cluster manager may dynamically instantiate and distribute a virtual media processing device to a network node to as part of a video signal processing flow.

The user interface may further comprise a scheduling feature that receives user input of a time when the virtual media processing device is to be provisioned across the at least one network processing node.

The cluster manager may automatically select an application at 404 that will provide the signal processing capability. The selected application may be comprised in the virtual media processing device created at 406. Thus, the creation of the virtual media processing device at 406 may be based on the automatic selection of an application by the cluster manager to meet the signal processing capability needs of the user.

The distribution of the virtual media processing device to a selected network processing node may be based on network processing node resources and a current distribution of other virtual media processing devices. The cluster manager may further assign memory resources of the at least one processing node based on a video picture format. For example, the memory resources of the processing node(s) may be allocated based on at least one of picture resolution, frame rate, computational horse power and memory access bandwidth Signal processing applications for a virtual media processing device may typically require CPU cycles for computation and memory capacity for instruction code, independent variables and intermediate computational results. However, memory may be a functional requirement of the application in order to generate delay, or convert between time bases. Frame synchronizers may be used to align video signals coming from a time basis which is asynchronous to the common time base used for a particular production. A broadcast facility often calls this process ingest. A memory buffer which can store at least 1 frame of video, and bit more, may be used to then align the incoming video to the processing time base, occasionally dropping or repeating a frame. In the dynamic environment present herein, the cluster manager may assign memory more optimally based upon its knowledge of the video picture format requiring alignment, e.g., because higher resolution signals need more memory.

For example, in a different application, video recorders may operate at a higher frame rate than normal play back. One example application may record at 6× the normal frame rate. This allows the example application to play back its recorder images in super slow motion. Because there are 6× the number of images, the example, application may use compression to store the images, which incurs some latency. This may require processing memory and storage memory.

The cluster manager may allocate such memory. This process could be distributed across nodes in concept, however, a very low latency may be required. This might be difficult, however, when the application is used in real-time type applications, such as live sports applications that must appear to be real time.

A node may have variable memory capacity, increasing internal bus bandwidth and more computational horsepower. There will likely be advances in CODEC algorithms. The cluster manager may allocate resources based upon any of CODEC type, picture resolution, frame rate, computational horse power and memory access bandwidth, etc. Given this rich pallet of options, there could be more than one application generated when the resolution is low, or the application may be distributed across nodes when the compression ratio is high and the CODE algorithm is low latency. The cluster manager also provides an option to allocate the whole node's memory, e.g., in order to create a full bandwidth, high resolution application. While such an application might not be viable as a stand-alone product, e.g., the CAPEX may be prohibitive. However, as a virtual device, the cluster manager may dynamically provide such capabilities. The cluster manager may optimize storage as an integral part of the signal processing application, not just simply as instruction and computational storage.

The cluster manager may provide a scheduling feature that enables a user to enter a time at which a virtual media processing device instance is to be provisioned. For example, a calendar icon may be provided at a user interface to launch a booking system. The booking system may enable the user to schedule the provisioning of different instances of virtual media processing devices for different days or times of day. For example, a number of ingest virtual media processing devices may be scheduled for provisioning in the morning. Then, a number of playout virtual media processing devices may be scheduled to be provisioned at the end of the day, e.g., during prime time playout. This allows a user to manage a general computer as a VRU and to dynamically adjust the VRU according to varying needs and to schedule such adjustments in advance according to anticipated needs. The scheduling feature enables the user to dynamically adjust an amount of processing resources used at any particular time. Once instantiated, virtual media processing device may show as an icon in the VRU. This visually represents a traditional way of installing equipment. However, the user does not need to be aware of a physical location of the virtual media processing equipment, the underlying software, or the network processing nodes with available capacity. Instead, the user is able to configure a video signal flow with virtual media processing devices using a VRU at a user interface.

Aspects may further include the dynamic update of resource requirements for a virtual media processing device based on actual usage of virtual media processing device instance. For example, a particular virtual media processing device instance may have an initial resource requirement setting. Monitoring software at the cluster manager may monitor the actual capacity used by the particular client over time for the virtual media processing device instance. Using analytics, the cluster manager may determine that for this particular client, the resource requirement for the virtual media processing device instance should be adjusted up or down. The cluster manager may generate a profile over time for the virtual media processing device instance for the user. The resource requirement for virtual media processing devices may even change over time for a client as their needs change. The size of the virtual media processing device icon may change with the adjustment to the resource requirements. A user may need to approve the change in resource requirements via the user interface. For example, a proposed adjustment to the resource requirements for a virtual media processing device may be presented to the user via the user interface and approval may be requested. If the user indicates their approval, the change may go into effect. As an alternative, a user may select a dynamic control option that enables automatic dynamic control of VRU requirements.

FIG. 5 is a diagram 500 illustrating an example of a hardware implementation for an apparatus 312' employing a processing system 514. The apparatus 500 may comprise or be comprised in cluster manager 312 from FIG. 3, and may have a connection via communications path 522 to network 502 (e.g., network 302) and via network 502 to user terminal 508 (e.g., 308).

The apparatus may comprise a reception component 532 configured to receive a user input regarding a signal processing capability, and a creation component 534 configured to dynamically create a virtual media processing device to provide the signal processing capability. The apparatus may also comprise a network node component 536 configured to determine network processing node resources of network processing nodes and determine a current distribution of other virtual media processing devices across the network processing nodes. The apparatus may comprise a distribution component 540 configured to distribute the virtual media processing device to a selected network processing node based on the determination by the network node component 536. The apparatus may include an application selection component 538 configured to automatically select an application that will provide the signal processing capability. The apparatus may comprise a quality component 542 configured to determine a quality of the signal processing flow, wherein the distribution by the distribution component may be adjusted based on the determined quality. The apparatus may comprise a user interface component 544 configured to provide a graphical representation of the instantiated virtual media processing device at a user interface. The apparatus may comprise a video signal processing component 546 configured to process a video signal using the signal processing flow formed by the instantiated virtual media processing device and the other virtual media processing devices distributed across the network processing nodes. The apparatus may comprise a decommission component 548 configured to dynamically decommission the created virtual media processing device when the signal processing capability is no longer required. The determination may be based on a user input at a user interface and received by the apparatus via the reception component 532.

The apparatus may include additional components that perform each of the blocks of the algorithm in the aforementioned flowchart of FIG. 4 and that performs the aspects described in connection with FIGS. 1-4 and 6-8. As such, each block in the aforementioned flowchart of FIG. 4 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

The processing system 514 may be implemented with a bus architecture, represented generally by the bus 524. The bus 524 may include any number of interconnecting buses and bridges depending on the specific application of the processing system 514 and the overall design constraints. The bus 524 links together various circuits including one or more processors and/or hardware components, represented by the processor 504, the components 532, 534, 536, 538, 540, 542, 544, 546, 548, and the computer-readable medium/memory 506. The bus 524 may also link various other circuits such as timing sources, peripherals, voltage regulators, and power management circuits, which are well known in the art, and therefore, will not be described any further.

The processing system 514 may be coupled to a communications path via a communication interface that provide means for communicating with various other apparatus over a transmission medium. The communication interface receives a signal from the communications path, extracts information from the received signal, and provides the extracted information to the processing system 514. In addition, the communication interface receives information from the processing system 514, and based on the received information, generates a signal to be transmitted to the other devices via the communications path.

Communications interface 520 allows software and data to be transferred between processing system and external devices. Examples of communications interface 520 may include a modem, a network interface (such as an Ethernet card), a communications port, a Personal Computer Memory Card International Association (PCMCIA) slot and card, etc. Software and data transferred via communications interface 520 may be are in the form of signals, which may be electronic, electromagnetic, optical or other signals capable of being received by communications interface 520. These signals 520 may be provided to communications interface 520 via a communications path (e.g., channel) 522, e.g., via network 302 in FIG. 3. This path 522 carries signals and may be implemented using wire or cable, fiber optics, a telephone line, a cellular link, a radio frequency (RF) link and/or other communications channels.

Computer programs (also referred to as computer control logic) are stored in main memory 506. Computer programs may also be received via communications interface 520. Such computer programs, when executed, enable the processing system 514 to perform the VRU aspects, as discussed herein. The processing system 514 includes a processor 504 coupled to a computer-readable medium/memory 506. The processor 504 is responsible for general processing, including the execution of software stored on the computer-readable medium/memory 506. The software, when executed by the processor 504, causes the processing system 514 to perform the various functions described supra for any particular apparatus. The computer-readable medium/memory 506 may also be used for storing data that is manipulated by the processor 504 when executing software. The processing system 514 further includes at least one of the components 532, 534, 536, 538, 540, 542, 544, 546, 548. The components may be software components running in the processor 504, resident/stored in the computer readable medium/memory 506, one or more hardware components coupled to the processor 504, or some combination thereof.

In one configuration, the apparatus 500/312' may include means for receiving a user input regarding a signal processing capability, means for dynamically creating a virtual media processing device to provide the signal processing capability, means for determining network processing node resources of the at least one network processing node, means for determining a current distribution of other virtual media processing devices across the at least one network processing node, means for distributing the virtual media processing device to a selected network processing node, means for maintaining a spare network processing node among a plurality of network processing nodes, means for processing a video signal using the signal processing flow formed by the instantiated virtual media processing device, means for determining a quality of the signal processing flow, means for adjusting the distribution of the plurality of different virtual media processing devices across the network processing nodes, means for determining that the signal processing capability is no longer required, means for dynamically decommissioning the created virtual media processing device, means for providing a graphical representation of the virtual media processing device at a user interface, and means for assigning memory resources of the at least one processing node based on a video picture format. The aforementioned means may be one or more of the aforementioned components of the apparatus 500/312' and/or the processing system 514 of the apparatus 500/312' configured to perform the functions recited by the aforementioned means.

The user interface, e.g., described in connection with FIG. 1 may include additional aspects.

Different applications may have different computer requirements. Such computer requirement may be more than just a CPU usage, it may include any of CPU usage, bandwidth, RAM usage, storage requirements, networking requirements, headroom, disk usage, specific hardware dependency, priority, etc. The size of each virtual media processing device in the VRU may vary based on an amount of requirements of the software for the virtual media processing device. For example, in FIG. 1, the virtual media processing device icon for a playout channel, e.g. iTX at slot 104t is larger than the virtual media processing device icons for Stills-1 at slot 104a, Clip Player 1 at slot 104b, etc. In this example, the playout channel virtual media processing device may only require 5-6% of CPU most of the time. However, at transition or other points of time, the playout channel virtual media processing device may spike usage to 20%. Thus, headroom may be allocated to accommodate for such spikes in capacity usage.

For example, the virtual media processing device icon 104t is shown as larger than the still and logo icons 104a, 104k, 104l. This difference in size allows a user to visually recognize the bandwidth requirements of different virtual media processing device that the user may provision. Software has no physical size for an equipment rack, so this size of the virtual media processing device may be a virtual size relating to computing capacity and other requirements of the virtual media processing device. A pricing model may be established based on rack unit usage, e.g., based on compute requirements and business value. For example, a slot of requirements resources in a VRU may have an established price. The user may then pay according to the number of VRU slots that the user desires to configure. As described for the virtual media processing device 104t, the requirements of an application may vary. Therefore, the cost of such an application may be based on potential requirements and may be higher than a current requirement.

The VRU requirements may be established or defined in a package and may not be reduced by an user. A user may instantiate multiple instances of a virtual media processing device. Each instance may have its own virtual media processing device icon so that the user can be aware of the resources required for each instance. The virtual media processing device may be purchased or otherwise selected from an application store once, and may then be instantiated as many times as the user desires within their available computing capacity, as indicated by their VRU rack configuration. If the user runs low on VRU capacity, the user may purchase or otherwise select additional VRU capacity and may then fill the VRU capacity with any desired combination of virtual media processing devices for applications to which they have access.

Aspects may include collecting VRU usage and reporting it in a monthly manner, annual manner, etc. The cluster may generate a log with details regarding application instances and VRU usage statistics.

FIG. 6 illustrates an example page 600 of a user interface, e.g., of the VRU user interface of FIGS. 1, 2, 4, and 5. In FIG. 6, the packages tab 610 is highlighted to indicate which page is presented. The user may access the packages page 600 by selecting the packages tab 410 at the user interface illustrated in any of FIGS. 1, 2, 4, and 5. The packages tab 610 may display an application store that presents the user with information regarding potential virtual media processing devices for purchase or selection. The application store provided via the packages page may be refreshed via the Cloud so that it is always up to date. The user may view and/or search for virtual media processing devices. The packages page may provide a description 602 regarding what the virtual media processing device does and an example screen shot 604 regarding a potential virtual media processing device. In FIG. 6, information is displayed regarding a potential Stills Store application. New virtual media processing devices may be marked with a "new" indication. Any virtual media processing devices that have a version higher than the version currently installed in the user's VRU racks may be marked with an "updated" indication. A label 606 may be highlighted to indicated whether the category of the virtual media processing device is transmission, production, signal processing, engineering, etc. A list 610 of potential applications may be presented. A search bar 608 may enable the user to search and/or filter the list 610 of virtual media processing devices using entry of a search word. Clicking on, or otherwise selecting, a virtual media processing device from the list 610 may cause additional details to be displayed. Such additional details may comprise any of a full screen shot, a full virtual media processing device description, a VRU requirement, any other dependencies or requirements, such as GPU requirements, a non-real time indicator, and a list of versions. For example, in FIG. 6, the Stills Store virtual media processing device is selected, as indicated by the shading. The available versions for the Stills Store are listed at 612, along with information regarding the versions. A button may be provided on each version in the list that provides detailed information regarding release notes for the specific version. Additionally, a button 614 may be provided that marks the selected release as the active release. The "active" release is the release that will be used when a virtual media processing device instance is started up. A user may select a particular version for purchase. As an alternative, when a virtual media processing device is purchased, all of the versions may be made available to the user. Then, when the user installs an virtual media processing device instance at their VRU racks, the user may select the desired version.

FIG. 7 illustrates an example status page 700 of the user interface that illustrates a summary of the status of each of the virtual media processing device instances in the VRU configuration at the user interface, e.g., the VRU from FIGS. 1, 2, 6 and 8. In FIG. 7, the status tab 702 is highlighted. The status page may identify all of the installed virtual media processing devices and may provide technical information about each of those virtual media processing device instances. For example, the status page may identify each virtual media processing device instance by name and may provide information in a list regarding any of state, a package, and a version of each of the virtual media processing device instances. When one application from the list is selected, e.g., in FIG. 7, Clip Player 1 (SD) is selected, additional details regarding that virtual media processing device instance may be displayed. As illustrated, these additional details may include any of name, state, description, previous state, health, a URI, and a corresponding process for the selected virtual media processing device instance. The user may access the status page by selecting the status tab 402 at the user interface.

FIG. 8 illustrates an example Nodes page 800 of the user interface that illustrates information about the installed network processing nodes in the cluster and provides details about the type of node and what is currently running on the node. In FIG. 8, the nodes tab 802 is highlighted. The user may access the nodes page by selecting the nodes tab 802 at the user interface. As in FIG. 8, tabs 804a, 804b may be provided to display information regarding different network processing nodes. In FIG. 8, the Node 1 tab 804a is selected. In the example in FIG. 8, information regarding the network processing node is displayed including a device class, VRU size, VRU that is free, a URL, notes regarding the health of the network processing node. The number of virtual media processing devices, whether the virtual media processing devices are running, have errors or have failed may also be included for Node 1. The amount of memory may be detailed, including the amount of available memory and the amount of memory being used. In FIG. 8, a list of virtual media processing devices allocated to Node 1 is listed along with each virtual media processing device's state. In FIG. 8, the Logo virtual media processing device is selected, as indicated by the shading. Through the selection of the Logo virtual media processing device instance, the details of the virtual media processing device instance are displayed, e.g., including virtual media processing device instance name, state, previous state, description, package, memory usage, processor usage, and health. Therefore, the nodes page 800 enables the user to access and view details regarding each virtual media processing device instance allocated to that network processing node.

The nodes page 800 may provide a number of features to the user to manage the network processing nodes in the cluster. The nodes page may allow a user to take a node offline to prevent it being used for further requests. The nodes page may allow a user to force a virtual media processing device to migrate off a network processing node to a new network processing node. For example, a network processing node may be marked as offline so that it could be freed up for maintenance.

Although not illustrated, an edit page may also be provided that provides a user interface that allows the user to add and remove virtual media processing devices. This may be similar to an application store, such as at package page 600, and may present options regarding the virtual media processing devices for download. A user may merely select a virtual media processing device for download. The selected virtual media processing device may then be downloaded to the remote cluster manager associated with the user. Once downloaded, the virtual media processing device may be instantiated as many times as the user would like. Each instance will require capacity to be provisioned.

At times, due to the VRU configuration, a cluster manager may need to communicate with the plant router, but is not straightforward due to the fact that virtual media processing devices may be on different sources on the router at different times. In order to solve this problem, virtual cross points may be used. The virtual cross points may be initially set up manually in the router control system as virtual media processing devices are initially added to the cluster. For example, if 4 still stores were added to the system, a user may find 4 sources on the router labelled Stills-1 to 4, regardless of where still store instances were actually running. By adding 4 virtual cross points comprising a source and a destination called Stills-1 to 4, enables the user to configure the virtual media processing device to route the current physical output to the virtual destination. The routing may happen whenever a virtual media processing device instance starts up.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "mechanism," "element," "device," and the like may not be a substitute for the word "means." As such, no claim element is to be construed as a means plus function unless the element is expressly recited using the phrase "means for."

What is claimed:

1. A system for dynamic optimizing of resources for a media processing platform, the system comprising:
   a resource manager configured to provide a plurality of applications for performing a plurality of media signal processing functions as part of the media processing platform, and further configured to distribute a plurality of virtual media processing devices across a plurality of media processing nodes in a cloud network that are each configurable for executing one or more of the plurality of media signal processing functions for the media processing platform to generate a media production;
   a display screen configured to display a user interface that enables a user to provision and un-provision one or more of the plurality of virtual media processing devices for the media processing platform, such that the user interface displays the plurality of virtual media processing devices that are provisioned for the media processing platform to generate the media production;
   wherein the resource manager is further configured to determine processing resource capacities and capabilities for each of the plurality of media processing nodes in the cloud network,
   wherein the resource manager is further configured to dynamically instantiate the provisioned plurality of virtual media processing devices and at least one application of the plurality of applications across the plurality of media processing nodes to perform the corresponding media signal processing functions, and
   wherein the resource manager is further configured to optimize the media processing platform to generate the media production by distributing the instantiated plurality of virtual media processing devices and the corresponding at least one application to the plurality of media processing nodes, respectively, based on the determined processing resource capacities and capabilities for each respective media processing node of the plurality of media processing nodes.

2. The system according to claim 1, wherein the user interface is configured to receive a user input as a dragging and dropping of an icon to provision a virtual media processing device of plurality of virtual media processing devices for the media processing platform.

3. The system according to claim 2, wherein the icon visually represents a bandwidth requirement for the respective media processing node that is executing the corresponding at least one application of the provisioned virtual media processing device.

4. The system according to claim 1, wherein the display screen is further configured to display the user interface to include a virtual configuration with a plurality of nodes that illustrate the provisioned virtual media processing devices as part of the media processing platform.

5. The system according to claim 4, wherein a total number of the plurality of virtual media processing devices of the virtual configuration represents a total amount of computing resources of the plurality of media processing nodes in the cloud network that are available for the media processing platform.

6. The system according to claim 1, wherein each of the provisioned virtual media processing devices provides a graphical representation on the user interface that indicates an amount of computing resources utilized by the respective media processing node in the cloud network that is proportional to a total amount of computing resources available for the medial processing platform.

7. The system according to claim 6, wherein the graphical illustration comprises at least one virtual equipment rack comprising a plurality of slots that correspond to the plurality of virtual media processing devices.

8. The system according to claim 7, wherein each instantiated virtual media processing device occupies a number of slots of the plurality of slots of the virtual equipment rack that is proportional to the amount of computing resources utilized by an instance of the virtual media processing application that corresponds to the allocated remote computing device.

9. The system according to claim 1, wherein each of the plurality of virtual media processing devices comprises an indicator of an execution state of the corresponding at least one application, with the execution states comprising one of provisioned, executing, and non-provisioned.

10. The system according to claim 1, wherein, responsive to the user input to the user interface, the resource manager is configured to transmit a configuration command to each of the plurality of media processing nodes on which the provisioned plurality of virtual media processing devices are instantiated for configuration thereof to execute the at least one corresponding application for each respective virtual media processing device.

11. The system of claim 1, wherein the user interface is further configured to display on the display screen an indicator of a total amount of media processing capacity available for all of the plurality of media processing nodes in the cloud network.

12. The system of claim 1, further comprising a memory and a processor configured to implement instructions on the memory so as to provide the resource manager.

13. A system for dynamic optimizing of resources for a media processing platform, the system comprising:
   a resource manager configured to allocate a plurality of virtual media processing devices across a plurality of media processing nodes in a distributed network that are each configurable for executing one or more media signal processing functions for the media processing platform to generate a media production;
   a display screen configured to display a user interface that enables a user to provision and un-provision one or more of the plurality of virtual media processing devices for the media processing platform;
   wherein the resource manager is further configured to determine processing resource capacities and capabilities for each of the plurality of media processing nodes in the distributed network, and
   wherein the resource manager is further configured to optimize the media processing platform to generate the media production by dynamically distributing the provisioned plurality of virtual media processing devices across the plurality of media processing nodes to perform the one or more media signal processing functions based on the determined processing resource capacities and capabilities of each of the plurality of media processing nodes.

14. The system according to claim 13, wherein the user interface is configured to receive a user input as a dragging and dropping of an icon to provision a virtual media processing device of plurality of virtual media processing devices for the media processing platform.

15. The system according to claim 14, wherein the icon visually represents a bandwidth requirement for the respective media processing node that is performing the corresponding one or more media signal processing functions.

16. The system according to claim 13, wherein the display screen is further configured to display the user interface to include a virtual configuration with a plurality of nodes that illustrate the provisioned virtual media processing devices as part of the media processing platform, and a total number of the plurality of virtual media processing devices of the virtual configuration represents a total amount of computing resources of the plurality of media processing nodes in the distributed network that are available for the media processing platform.

17. The system according to claim 13, wherein each of the provisioned virtual media processing devices provides a graphical representation on the user interface that indicates an amount of computing resources utilized by the respective media processing node in the distributed network that is proportional to a total amount of computing resources available for the medial processing platform.

18. The system according to claim 17,
   wherein the graphical illustration comprises at least one virtual equipment rack comprising a plurality of slots that correspond to the plurality of virtual media processing devices, and
   wherein each instantiated virtual media processing device occupies a number of slots of the plurality of slots of the virtual equipment rack that is proportional to the amount of computing resources utilized by an instance of the virtual media processing application that corresponds to the allocated remote computing device.

19. The system according to claim 13, wherein each of the plurality of virtual media processing devices comprises an indicator of an execution state of the corresponding at least one application, with the execution states comprising one of provisioned, executing, and non-provisioned.

20. The system according to claim 13, wherein, responsive to the user input to the user interface, the resource manager is configured to transmit a configuration command to each of the plurality of media processing nodes on which the provisioned plurality of virtual media processing devices are instantiated for configuration thereof to execute the at least one corresponding application for each respective virtual media processing device.

21. The system according to claim 13, wherein the distributed network is a cloud based network.

22. The system of claim 13, further comprising a memory and a processor configured to implement instructions on the memory so as to provide the resource manager.

* * * * *